US012626583B1

(12) United States Patent
Tan et al.

(10) Patent No.: US 12,626,583 B1
(45) Date of Patent: May 12, 2026

(54) METHODS AND SYSTEMS FOR CONTROLLING AN EMERGENCY RESPONSE DEVICE

(71) Applicant: MOTOROLA SOLUTIONS, INC., Chicago, IL (US)

(72) Inventors: Woei Chyuan Tan, Bayan Lepas (MY); Chung Yong Chong, Simpang Ampat (MY); Sowmya Gendehally Ramegowda, Hassan (IN); Lakshmi Yuvaraj, Bangalore (IN)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 19/011,110

(22) Filed: Jan. 6, 2025

(51) Int. Cl.
| | |
|---|---|
| *G08B 25/10* | (2006.01) |
| *G06Q 50/26* | (2012.01) |
| *G08B 7/06* | (2006.01) |
| *G08B 25/00* | (2006.01) |
| *H04N 7/18* | (2006.01) |

(Continued)

(52) U.S. Cl.
CPC ........... *G08B 25/10* (2013.01); *G06Q 50/265* (2013.01); *G08B 7/06* (2013.01); *G08B 25/004* (2013.01); *H04N 7/181* (2013.01); *H04N 7/188* (2013.01); *H04N 23/90* (2023.01); *H04R 1/028* (2013.01); *H04R 1/406* (2013.01)

(58) Field of Classification Search
CPC ........ G08B 25/10; G08B 7/06; G08B 25/004; H04N 23/90; H04N 7/181; H04N 7/188; G06Q 50/265
See application file for complete search history.

(56) References Cited

U.S. PATENT DOCUMENTS

| | | | |
|---|---|---|---|
| 6,275,164 B1 | 8/2001 | MacConnell et al. | |
| 10,817,625 B2 | 10/2020 | Pasternak et al. | |

(Continued)

FOREIGN PATENT DOCUMENTS

| | | |
|---|---|---|
| CN | 101106478 A | 1/2008 |
| EP | 3270361 B1 | 6/2019 |
| WO | 9716932 A1 | 5/1997 |

OTHER PUBLICATIONS

Sentryers, "Emergency Lockdown Response Systems," <https://ipvideocorp.com/solutions/sentry-ers/> web page visited Dec. 4, 2024 (7 pages).

*Primary Examiner* — Mishawn N. Hunter
(74) *Attorney, Agent, or Firm* — Michael Best & Friedrich LLP

(57) ABSTRACT

One example system includes an alerting device and a second portable communication device. The alerting device may include a docking station and a first portable communication device removably secured to the docking station. The alerting device may output an alert including an audible alert, a visible alert, or both the audible alert and the visible alert in response to determining that the first portable communication device has been removed from the docking station. The second portable communication device may be configured to transmit, in response to activating a silent emergency report based on a user input, a signal to cause the alerting device to operate in a stealth mode in which the alerting device is configured to refrain from outputting the alert in response to determining that the first portable communication device has been removed from the docking station.

20 Claims, 6 Drawing Sheets

(51) Int. Cl.
> *H04N 23/90*      (2023.01)
> *H04R 1/02*       (2006.01)
> *H04R 1/40*       (2006.01)

(56)        References Cited

U.S. PATENT DOCUMENTS

| | | | |
|---|---|---|---|
| 11,023,988 B2 | 6/2021 | Stochel et al. | |
| 11,812,344 B2 | 11/2023 | Devaraj et al. | |
| 11,837,077 B1 | 12/2023 | Rintz et al. | |
| 2004/0203667 A1 | 10/2004 | Schroeder et al. | |
| 2005/0208925 A1* | 9/2005 | Panasik | H04M 1/72421 |
| | | | 455/404.1 |
| 2008/0214142 A1* | 9/2008 | Morin | H04M 1/72424 |
| | | | 455/404.1 |
| 2015/0341301 A1 | 11/2015 | Peterson et al. | |
| 2016/0012712 A1* | 1/2016 | Mattiaccio, III | G08B 25/016 |
| | | | 340/539.11 |
| 2016/0180697 A1* | 6/2016 | Ros | G08B 25/016 |
| | | | 340/539.11 |
| 2016/0295387 A1* | 10/2016 | Rome | H04W 4/14 |
| 2020/0250960 A1 | 8/2020 | Pakula et al. | |
| 2025/0022360 A1* | 1/2025 | Pristelski | G08B 1/08 |

* cited by examiner

100

125 Command Center

105 Alerting Device

110 Docking Station

115 First Portable Communication Device

130 Network

120 Second Portable Communication Device

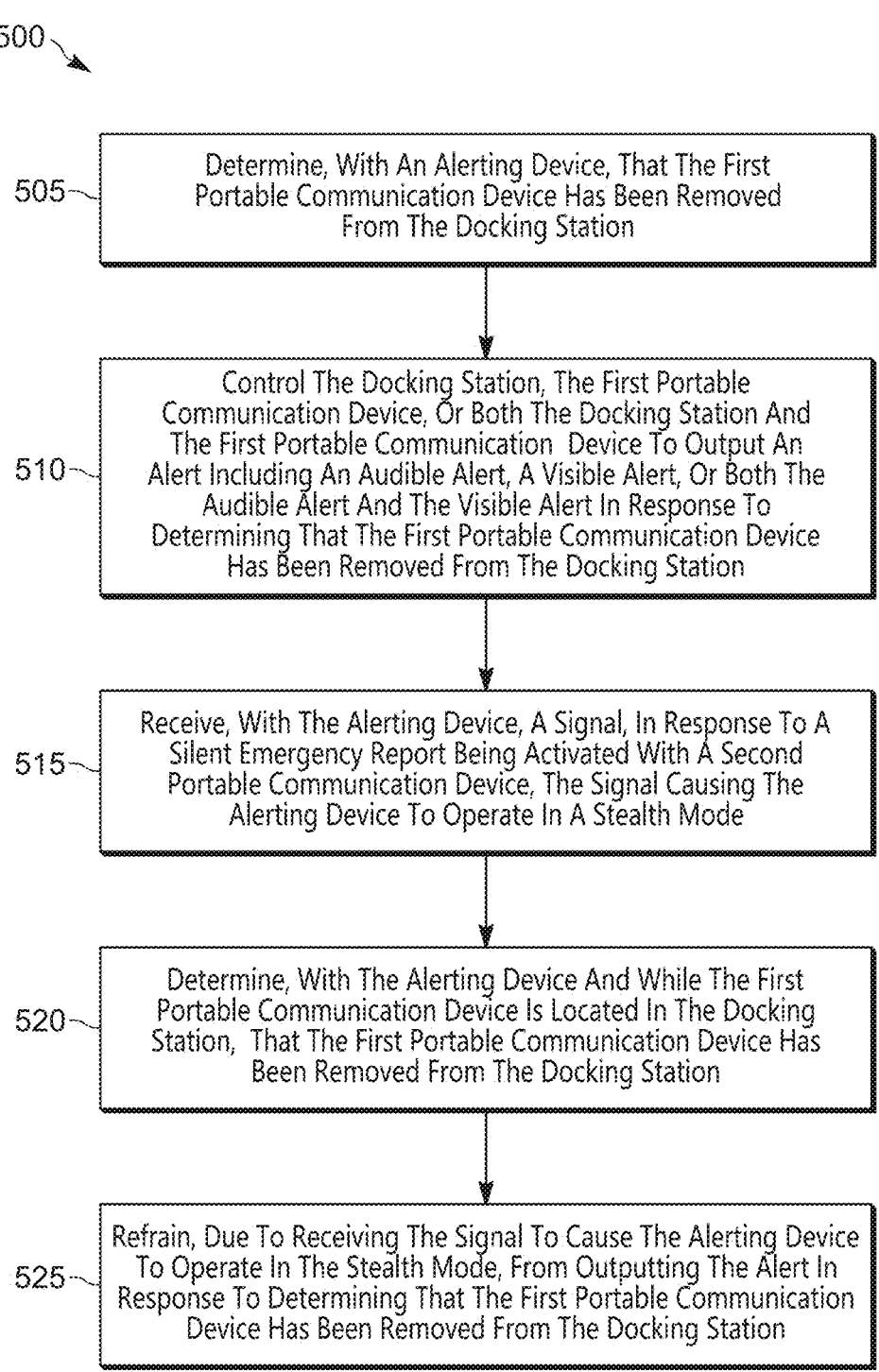

500

505 — Determine, With An Alerting Device, That The First Portable Communication Device Has Been Removed From The Docking Station 510 — Control The Docking Station, The First Portable Communication Device, Or Both The Docking Station And The First Portable Communication Device To Output An Alert Including An Audible Alert, A Visible Alert, Or Both The Audible Alert And The Visible Alert In Response To Determining That The First Portable Communication Device Has Been Removed From The Docking Station 515 — Receive, With The Alerting Device, A Signal, In Response To A Silent Emergency Report Being Activated With A Second Portable Communication Device, The Signal Causing The Alerting Device To Operate In A Stealth Mode 520 — Determine, With The Alerting Device And While The First Portable Communication Device Is Located In The Docking Station, That The First Portable Communication Device Has Been Removed From The Docking Station 525 — Refrain, Due To Receiving The Signal To Cause The Alerting Device To Operate In The Stealth Mode, From Outputting The Alert In Response To Determining That The First Portable Communication Device Has Been Removed From The Docking Station

FIG. 5

METHODS AND SYSTEMS FOR CONTROLLING AN EMERGENCY RESPONSE DEVICE

BACKGROUND OF THE INVENTION

Alerting devices such as emergency response devices may be located in areas that an emergency situation may occur to provide assistance to victims, witnesses, etc. during the emergency situation. For example, the alerting device may provide communication capabilities, audio and/or video monitoring, location awareness for public safety personnel aiding with the emergency situation, and/or the like. One or more alerting devices may be located in a school, on a campus, at a shopping mall, etc. A victim, witness, etc. of an emergency situation (e.g., a fire, an active shooter situation, a medical emergency, etc.) may use the alerting device to request help (e.g., from a public safety agency such as a police department, fire department, hospital/medical treatment center, etc.), alert other people around the area of the emergency situation, and/or the like.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments, examples, aspects, and features of concepts that include the claimed subject matter, and to explain various principles and advantages of those embodiments, examples, aspects, and features.

FIG. 5 is a flowchart of another method of controlling the alerting device of FIGS. 1-2B to operate in different alarm modes, according to one example embodiment.

Figure 1:
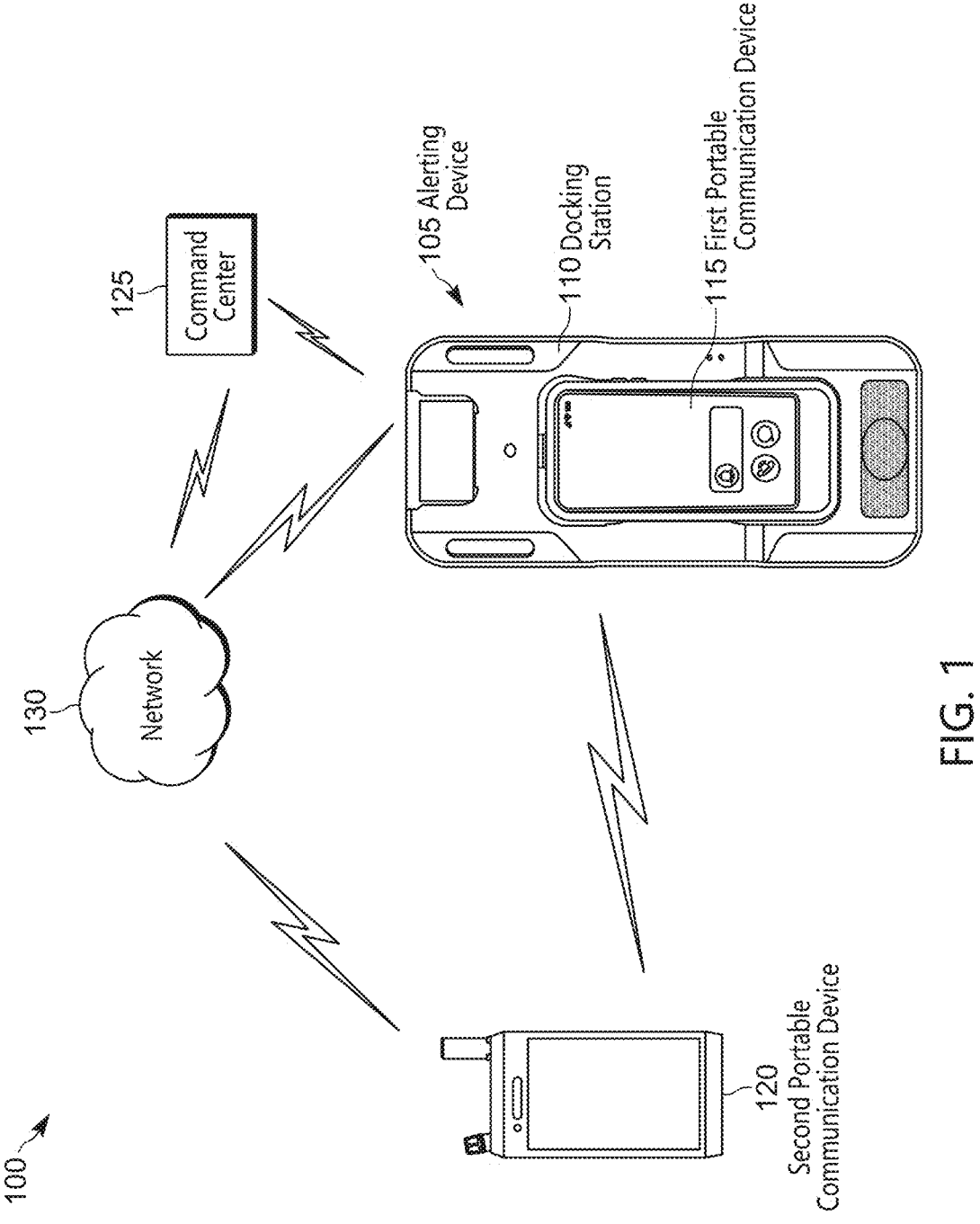
FIG. 1 is a diagram of a communication system according to one example embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of the examples, aspects, and features presented in this disclosure.

The system, apparatus, and method components have been represented where appropriate by conventional symbols in the drawings, showing only those specific details that are pertinent to understanding of the various embodiments, examples, aspects, and features of the present disclosure so as not to obscure the disclosure with details that will be readily apparent to those of ordinary skill in the art having the benefit of the description herein.

DETAILED DESCRIPTION OF THE INVENTION

As noted, a victim, witness, etc. of an emergency situation (e.g., a fire, an active shooter situation, a medical emergency, etc.) may use an alerting device (e.g., an emergency response device) to request help (e.g., from a public safety agency such as a police department, fire department, hospital/medical treatment center, etc.), alert others around the area of the emergency situation, and/or the like. Some alerting devices include a docking station that is configured to removably receive a portable communication device. To initiate an emergency report at the alerting device, a user may remove the portable communication device from the docking station and may use the portable communication device to communicate information about an emergency situation being experienced.

In response to the portable communication device being removed from the docking station, the alerting device may automatically complete one or more actions. For example, the alerting device may automatically provide (e.g., via wired and/or wireless communication) a notification to a public safety agency, a security supervisor, and/or another designated entity/person associated with the alerting device and/or a property at which the alerting device is located. Additionally or alternatively, the alerting device may begin recording audio and/or video in response to the portable communication device being removed from the docking station. Additionally or alternatively, the alerting device may output an alert including an audible alert, a visible alert, or both the audible alert and the visible alert to alert others nearby the alerting device that the portable communication device has been removed from the docking station to initiate an emergency report regarding an emergency situation.

However, noticeable alerts from the alerting device may be undesirable in certain situations. For example, noticeable alerts from the alerting device may agitate an active shooter during an active shooter emergency situation. Additionally, the emergency situation may have already been reported to the desired entities using other devices. As a more specific example, a witness may see an active shooter and may activate a silent emergency report on their own portable communication device (e.g., smart phone) in an attempt to avoid agitating the active shooter and to be able to escape to a safer area away from the active shooter. However, if a different person removes the portable communication device from the docking station of the alerting device to report the active shooter situation, the alerting device will output one or more noticeable alerts (e.g., audible and visible alerts) despite the active shooter situation already being reported by another portable communication device. These noticeable alerts may agitate the active shooter and/or may provide an indication to the active shooter that the active shooter has been discovered and that emergency responders are likely on the way.

Accordingly, there is room for a technological improvement with respect to alerting devices that are used to report emergency situations. Specifically, there is room to improve the functionality of alerting devices to respond/behave in a manner depending on a context of the emergency situation to determine whether noticeable alerts should be provided when the portable communication device is removed from the docking station of the alerting device.

The disclosed methods, devices, and systems provide, among other things, mechanisms and techniques for an alerting device to determine whether to output a noticeable alert in response to the portable communication device being removed from the docking station of the alerting device. As explained herein, the disclosed methods, devices, and systems include the alerting device receiving a signal in response to a silent emergency report being activated with a second portable communication device. The signal causes the alerting device to operate in a stealth mode in which the alerting device (i.e., the docking station and the first portable communication device) is configured to refrain from outputting one or more noticeable alerts (e.g., audible and/or visual alerts) in response to determining that the first portable communication device has been removed from the docking station. On the other hand, if the alerting device has not received the above-noted signal, the alerting device operates in normal/regular mode in which the alerting device outputs one or more noticeable alerts in response to determining that the first portable communication device has been removed from the docking station (e.g., to alert others nearby to the occurrence of the emergency situation).

The disclosed methods, devices, and systems provide a technological improvement by controlling the alerting device to operate differently in different situations depending on whether a silent emergency report has been previously (and recently) activated by another (nearby) communication device. Such control of the alerting device keeps users in or near compromised situations (e.g., an active shooter situation) safer by not agitating the active shooter or notifying the active shooter that an emergency alarm has been triggered while still allowing the users to remove the first portable communication device from the docking station of the alerting device for use in additional emergency reporting. For example, a second user who did not activate the silent emergency report may remove the first portable communication device from the docking station and escape back to another room to provide additional information to public safety personnel, security, etc. without drawing attention from the active shooter that may otherwise be drawn due to noticeable alerts being generated by the alerting device in response to the first portable communication device being removed from the docking station.

One example provides a system that may include an alerting device. The alerting device may include a docking station secured to a surface within a building. The docking station may include a first electronic processor. The alerting device may also include a first portable communication device removably secured to the docking station. The first portable communication device may include a first camera and a first microphone for capturing first input data. The first portable communication device may also include a second electronic processor for streaming the first input data to a remote location via a first network interface. The alerting device may be configured to determine that the first portable communication device has been removed from the docking station. The alerting device may also be configured to control the docking station, the first portable communication device, or both the docking station and the first portable communication device to output an alert including an audible alert, a visible alert, or both the audible alert and the visible alert in response to determining that the first portable communication device has been removed from the docking station. The system may also include a second portable communication device. The second portable communication device may include a user interface, a second network interface, and a third electronic processor coupled to the user interface and the second network interface. The third electronic processor may be configured to receive, via the user interface, a user input activating a silent emergency report at the second portable communication device. The third electronic processor may also be configured to transmit, via the second network interface and in response to activating the silent emergency report, a signal to cause the alerting device to operate in a stealth mode in which the docking station and the first portable communication device are configured to refrain from outputting the alert in response to determining that the first portable communication device has been removed from the docking station.

In addition to any combination of features described above, the docking station may include a second camera and a second microphone for capturing second input data. The first electronic processor may be configured to stream the second input data to the remote location via a third network interface of the docking station.

In addition to any combination of features described above, the signal from the second portable communication device may be configured to trigger the alerting device to begin capturing and streaming the first input data, the second input data, or both the first input data and the second input data.

In addition to any combination of features described above, the alerting device, when operating in the stealth mode, may be configured to begin capturing and streaming the first input data and the second input data in response to determining that the first portable communication device has been removed from the docking station.

In addition to any combination of features described above, the signal transmitted by the second portable communication device may include a wireless beacon signal. The third electronic processor may be configured to broadcast the wireless beacon signal for direct receipt by the alerting device. The alerting device may be located within a direct communication range of the second portable communication device with respect to the wireless beacon signal.

In addition to any combination of features described above, the system may include one or more additional alerting devices respectively secured to additional surfaces within the building. The one or more additional alerting devices may be configured to directly receive the wireless beacon signal from the second portable communication device and operate in the stealth mode in response to receiving the wireless beacon signal.

In addition to any combination of features described above, the third electronic processor may be configured to broadcast the wireless beacon signal for a predetermined period of time, and cease broadcasting the wireless beacon signal in response to the predetermined period of time elapsing.

In addition to any combination of features described above, the third electronic processor may be configured to determine a location of the second portable communication device in response to activating the silent emergency report. The third electronic processor may also be configured to determine that the alerting device is located within a predetermined proximity of the location of the second portable communication device. The third electronic processor may also be configured to transmit the signal to the alerting device in response to activating the silent emergency report and in response to determining that the alerting device is located within the predetermined proximity of the location of the second portable communication device. The signal transmitted by the second portable communication device may be addressed to the alerting device in response to determining that the alerting device is located within the predetermined proximity of the location of the second portable communication device.

In addition to any combination of features described above, the system may further include an external device configured to communicate with the second portable communication device and the alerting device. The third electronic processor may be configured to determine a location of the second portable communication device in response to activating the silent emergency report, and transmit the signal to the external device. The signal may indicate that the silent emergency report has been activated. The signal may indicate the location of the second portable communication device. The external device may be configured to receive the signal, determine that the alerting device is located within a predetermined proximity of the location of the second portable communication device, and transmit a second signal to the alerting device in response to determining that the alerting device is located within the predetermined proximity of the location of the second portable communication device. The second signal transmitted by the external device may be addressed to the alerting device in response to determining that the alerting device is located within the predetermined proximity of the location of the second portable communication device.

In addition to any combination of features described above, the docking station may be electrically coupled to an electrical system of the building.

Another example provides a method of operating an alerting device. The method may include determining, with the alerting device, that a first portable communication device of the alerting device has been removed from a docking station of the alerting device. The docking station may be secured to a surface within a building and may include a first electronic processor. The first portable communication device may be removably secured to the docking station. The first portable communication device may include a first camera and a first microphone for capturing first input data. The first portable communication device also may include a second electronic processor for streaming the first input data to a remote location via a first network interface. The method may also include controlling, with the alerting device, the docking station, the first portable communication device, or both the docking station and the first portable communication device to output an alert including an audible alert, a visible alert, or both the audible alert and the visible alert in response to determining that the first portable communication device has been removed from the docking station. The method may also include receiving, with a third electronic processor of a second portable communication device and via a user interface of the second portable communication device, a user input activating a silent emergency report at the second portable communication device. The method may also include transmitting, with the third electronic processor and via a second network interface of the second portable communication device and in response to activating the silent emergency report, a signal to cause the alerting device to operate in a stealth mode in which the docking station and the first portable communication device are configured to refrain from outputting the alert in response to determining that the first portable communication device has been removed from the docking station.

In addition to any combination of features described above, the docking station may include a second camera and a second microphone for capturing second input data. The first electronic processor may be configured to stream the second input data to the remote location via a third network interface of the docking station.

In addition to any combination of features described above, the signal from the second portable communication device may trigger the alerting device to begin capturing and streaming the first input data, the second input data, or both the first input data and the second input data.

In addition to any combination of features described above, the method may further include beginning, with the alerting device and when operating in the stealth mode, capturing and streaming the first input data and the second input data in response to determining that the first portable communication device has been removed from the docking station.

In addition to any combination of features described above, the signal transmitted by the second portable communication device may include a wireless beacon signal. The method may further include broadcasting, with the third electronic processor and via the second network interface, the wireless beacon signal for direct receipt by the alerting device. The alerting device may be located within a direct communication range of the second portable communication device with respect to the wireless beacon signal.

In addition to any combination of features described above, the method may further include directly receiving, with one or more additional alerting devices respectively secured to additional surfaces within the building, the wireless beacon signal from the second portable communication device. The method may further include operating the one or more additional alerting devices in the stealth mode in response to receiving the wireless beacon signal.

In addition to any combination of features described above, the method may further include broadcasting, with the third electronic processor, the wireless beacon signal for a predetermined period of time, and ceasing, with the third electronic processor, broadcasting the wireless beacon signal in response to the predetermined period of time elapsing.

In addition to any combination of features described above, the method may further include determining, with the third electronic processor, a location of the second portable communication device in response to activating the silent emergency report. The method may further include determining, with the third electronic processor, that the alerting device is located within a predetermined proximity of the location of the second portable communication device. The method may further include transmitting, with the third electronic processor and via the second network interface, the signal to the alerting device in response to activating the silent emergency report and in response to determining that the alerting device is located within the predetermined proximity of the location of the second portable communication device. The signal transmitted by the second portable communication device may be addressed to the alerting device in response to determining that the alerting device is located within the predetermined proximity of the location of the second portable communication device.

In addition to any combination of features described above, the method may further include determining, with the third electronic processor, a location of the second portable communication device in response to activating the silent emergency report. The method may further include transmitting, with the third electronic processor and via the second network interface, the signal to an external device configured to communicate with the second portable communication device and the alerting device. The signal may indicate that the silent emergency report has been activated. The signal may indicate the location of the second portable communication device. The method may further include receiving, with the external device, the signal. The method may further include determining, with the external device, that the alerting device is located within a predetermined proximity of the location of the second portable communication device. The method may further include transmitting, with the external device, a second signal to the alerting device in response to determining that the alerting device is located within the predetermined proximity of the location of the second portable communication device. The second signal transmitted by the external device may be addressed to the alerting device in response to determining that the alerting device is located within the predetermined proximity of the location of the second portable communication device.

In addition to any combination of features described above, the docking station may be electrically coupled to an electrical system of the building.

Each of the above-mentioned examples will be discussed in more detail below, starting with example system and device architectures of the system in which the examples may be practiced, followed by an illustration of processing blocks for achieving an improved technical method, device, and system for controlling an emergency response device.

Examples are herein described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some aspects, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any example, feature, aspect, or embodiment discussed in this specification can be implemented or combined with any part of any other example, feature, aspect, or embodiment discussed in this specification. For ease of description, some or all of the example systems and devices presented herein are illustrated with a single example of each of its component parts. Some examples may not describe or illustrate all components of the systems or devices. Other example embodiments may include more or fewer of each of the illustrated components, may combine some components, or may include additional or alternative components.

Further advantages and features consistent with this disclosure will be set forth in the following detailed description, with reference to the figures.

Figure 2A:
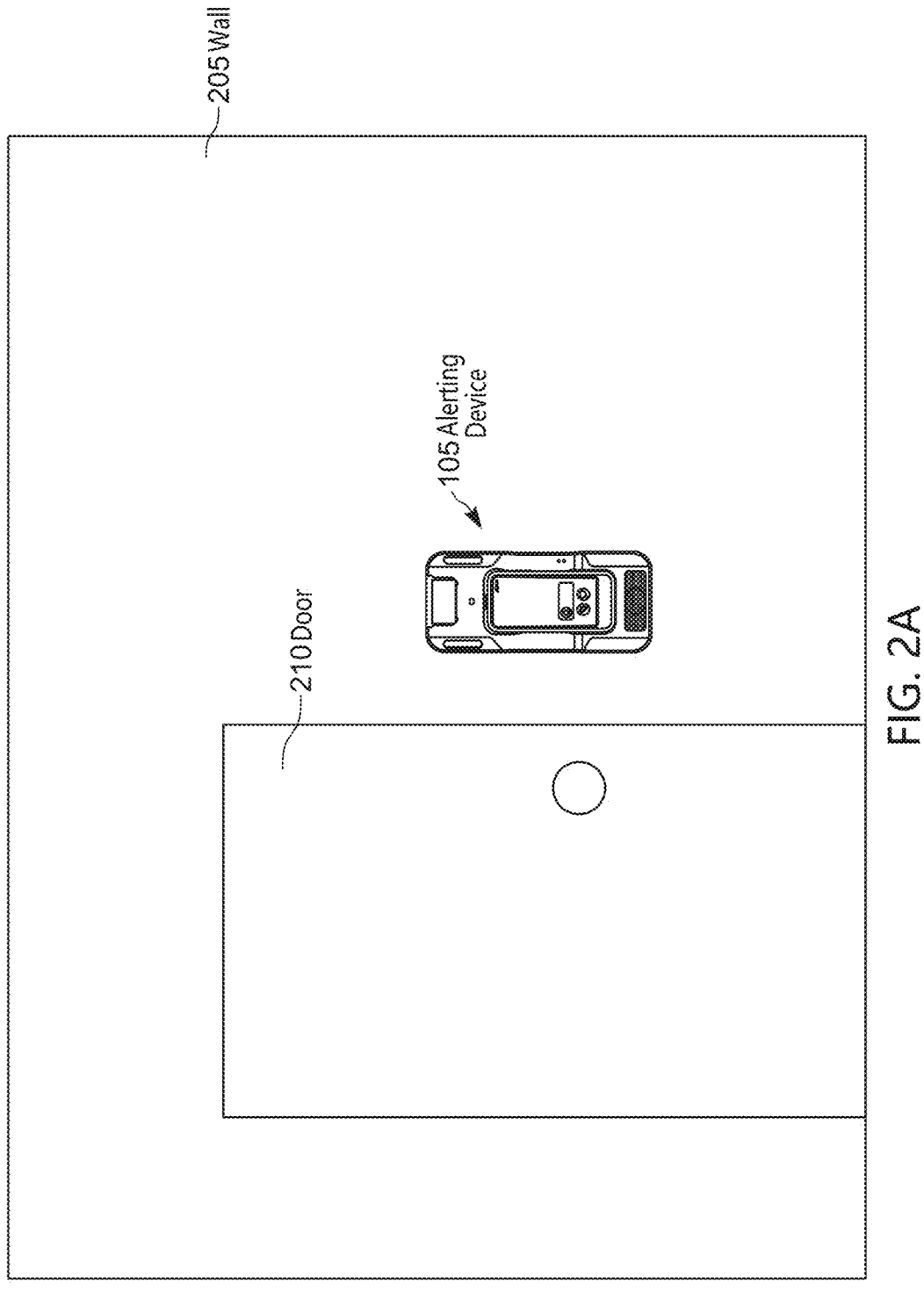
FIG. 2A illustrates a docking station of an alerting device included in the communication system of FIG. 1 according to one example embodiment.

FIG. 1 is a diagram of a communication system 100 according to one example embodiment. In the example illustrated, the communication system 100 includes an alerting device 105 that includes a docking station 110 and a first portable communication device 115 removably secured to the docking station 110. The docking station 110 may be secured (e.g., permanently or semi-permanently) to a surface (e.g., a wall) within a building (e.g., a school). For example, FIG. 2A illustrates the docking station 110 of the alerting device 105 mounted on a wall 205 next to a door 210 within a building (e.g., in a classroom of a school).

As shown in FIG. 1, the communication system 100 may also include a second portable communication device 120 and a command center 125. In some instances, the second portable communication device 120 is a handheld communication device, for example, a mobile telephone or other portable communication device, mobile vehicular radio, laptop computer, tablet computer, smart watch or other smart wearable, or may be another user equipment (UE) device configured to communicate with other devices included in the communication system 100. In some embodiments, the second portable communication device 120 is a desktop computer located in a classroom or office. When referring to the command center 125, it should be understood that one or more second portable communication devices 120 within the command center 125 provide the communication capabilities for the command center 125.

The portable communication devices 115, 120 may be configured to be operated by a user (e.g., a witness of an emergency situation, a victim of an emergency situation, a security officer, a public safety officer, a supervisor, a crisis response coordinators, and/or the like). Each second portable communication device 120 may be associated with a specific user (e.g., each user may own and use a smart phone). In some instances, a second portable communication device 120 may include ancillary devices communicatively coupled together. For example, the second portable communication device 120 may include a handheld communication device and a smart watch that are both associated with a single user.

As illustrated in FIG. 1, the alerting device 105, the second portable communication device 120, and/or the command center 125 are configured to communicate with each other via wired and/or wireless communication (for example, by sending and receiving radio signals directly to and from each other when within wireless communication range of each other and/or via a base station of a communication network 130). In an example embodiment, the communication network 130 that allows for bidirectional communication between devices in the communication system 100 is a 5G/LTE communication network. However, other communication networks may also be used. The communication network 130 may include wireless and wired portions. All or parts of the communication network 130 may be implemented using various existing or future-developed specifications or protocols. In some embodiments, the communication network 130 is implemented using a direct-mode, conventional, or trunked land mobile radio (LMR) standard or protocol, for example, a Digital Mobile Radio (DMR) standard defined by the European Telecommunications Standards Institute (ETSI), a Project 25 (P25) standard defined by the Association of Public Safety Communications Officials International (APCO), a Terrestrial Trunked Radio (TETRA) standard defined by the European Telecommunications Standards Institute (ETSI), or other LMR radio protocols or standards. In some embodiments, the communication network 130 implements the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VOIP), or a PTT over IP (PoIP) application may be implemented. The communication network 130 may also include future developed networks. In some embodiments, the communication network 130 may also include a combination of the networks mentioned.

In some embodiments, the devices 105 (including separate devices 110 and 115), 120, and 125 may additionally or alternatively be configured to communicate directly with each other using a communication channel or connection that is outside of the communication network 130. In some embodiments, the devices 105 (including separate devices 110 and 115), 120, and 125 may additionally or alternatively communicate with each other via wired or wireless connections, for example, over a local network that may be similar to the communication network 130 described immediately above. In some embodiments, the local network may be a local area network (LAN). In some embodiments, the devices 105 (including separate devices 110 and 115), 120, and 125 may additionally or alternatively communicate directly with each other when they are within a predetermined distance from each other using short-range communication mechanisms such as Bluetooth®, WiFi®, direct radio-to-radio LMR radio frequency (RF) communication links, and/or the like.

In some instances, the command center 125 is located at the same property/building as the location of the docking station 110 of the alerting device 105. For example, the command center 125 may be an on-site security office of the property/building. In some instances, the command center 125 is located off-site with respect to the property/building where the docking station 110 of the alerting device 105 is located. For example, the command center 125 may be a police station located miles away from the property/building where the docking station 110 is located. In both of the above-noted situations, the command center 125 may nevertheless be considered to be located at a remote location from the location of the docking station 110 since the command center 125 is not located in the immediate vicinity of the docking station 110. The alerting device 105 may be configured to stream input data gathered by the alerting device 105 to the command center 125. For example, the alerting device 105 may provide emergency notifications (e.g., indicating a type of emergency situation based on user input) to the command center 125 as well as information about an emergency situation occurring near the alerting device 105 in order to allow personnel at the command center 125 to aid in handling the emergency situation. In some instances, the docking station 110 is electrically coupled to an electrical system of the building in which the docking station 110 is located. For example, at least some electrical and/or communicative connections between the docking station 110 and the command center 125 may be hard wired. Additionally or alternatively, the docking station 110 and the command center 125 may be configured to wirelessly communicate with each other directly and/or via the network 130.

FIG. 1 illustrates only one example embodiment of the communication system 100. In other embodiments, the system 100 may include more or fewer components and may perform functions that are not explicitly described herein. For example, the communication system 100 may include additional or fewer alerting devices 105, second portable communication devices 120, and/or command centers 125 (i.e., command center communication devices). In some instances, a building such as a school may include an alerting device 105 in each classroom. Although not indicated in FIG. 1, in some instances, one or more of the second portable communication devices 120 may be able to directly communicate with the command center 125 without using the network 130 when the second portable communication device 120 is located within direct communication range of a command center communication device.

Figure 2B:
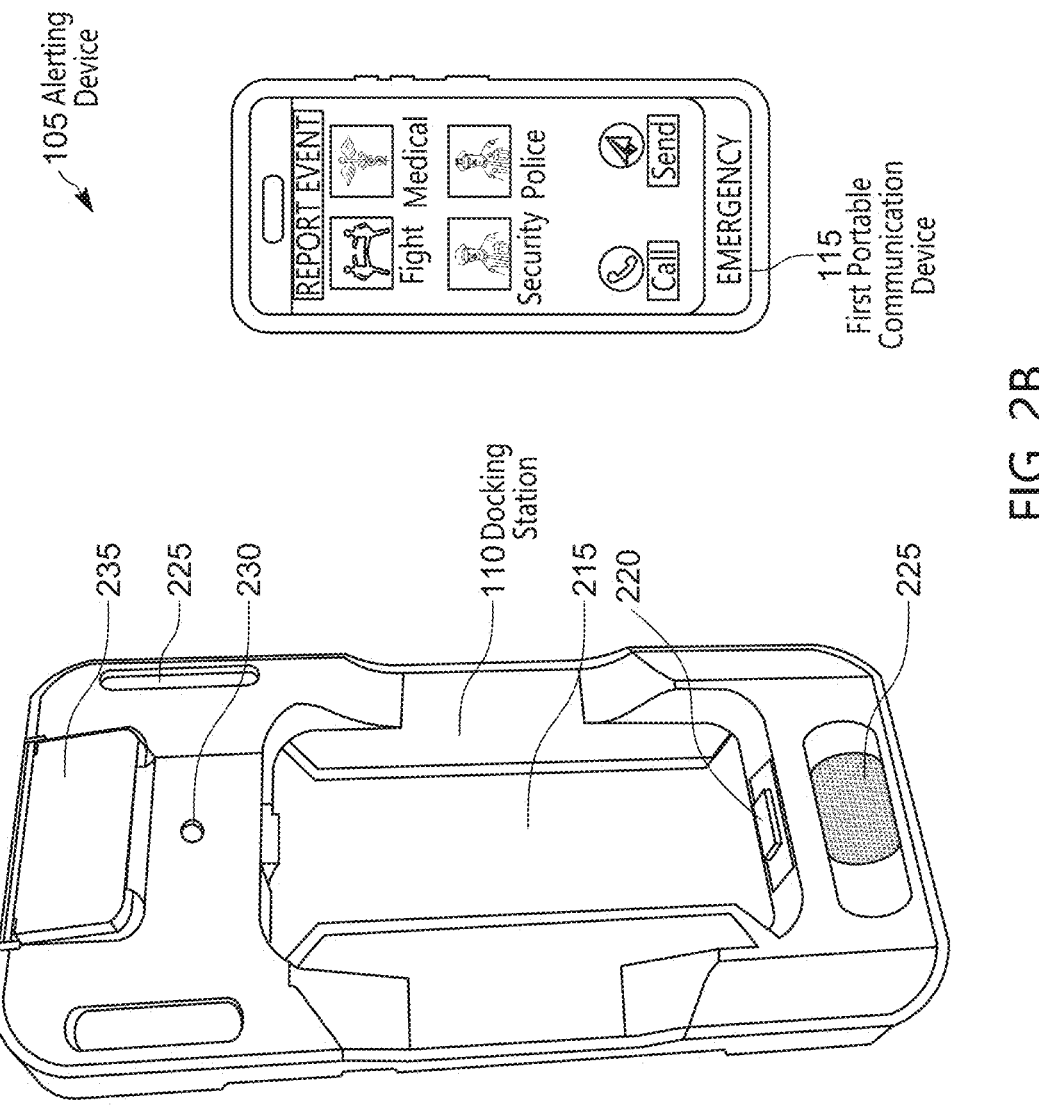
FIG. 2B illustrates the alerting device of FIGS. 1 and 2A with a first portable communication device removed from the docking station according to one example embodiment.

FIG. 2B illustrates the alerting device 105 of FIG. 1 with the first portable communication device 115 removed from the docking station 110 according to one example. In the example illustrated, the docking station 110 includes a docking area 215 in which the first portable communication device 115 is configured to be received and secured. The docking area 215 may include one or more docking terminals 220 configured to electrically and/or communicatively couple the first portable communication device 115 to the docking station 110 when the first portable communication device 115 is docked in the docking area 215. The docking station 110 may also include speakers 225 to provide audio output, and may include a camera 230 to capture images and/or video of an area in which the docking station 110 is located. The docking station 110 may also include an emergency/panic/lockdown button 235. The emergency/panic/lockdown button 235 may be covered by a movable panel to prevent accidental actuation of the button 235. In some instances, the alerting device 105 is embodied by a SentryERS Emergency Response System.

The first portable communication device 115 and the second portable communication device 120 may have similar components and may provide similar functionality. However, the first portable communication device 115 is specifically electrically and mechanically configured to operate in conjunction with the docking station 110 while the second portable communication device 120 may be configured to be operated as a personal device of a user (e.g., a smart phone).

Figure 3A:
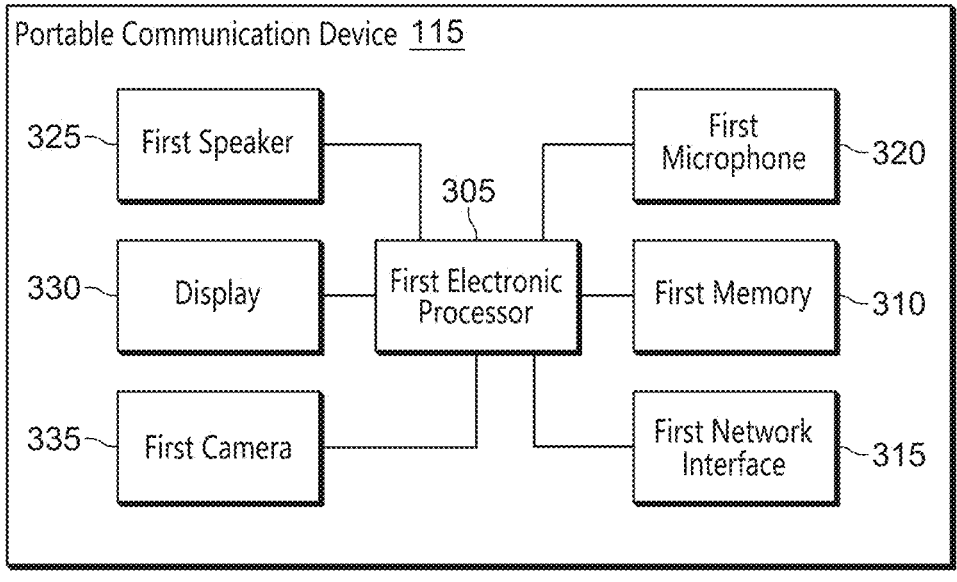
FIG. 3A is a block diagram of the first portable communication device of the alerting device of FIGS. 1-2B according to one example embodiment.

FIG. 3A is a block diagram of the first portable communication device 115 of the alerting device 105 according to one example. In the example illustrated, the first portable communication device 115 includes a first electronic processor 305 (for example, a microprocessor or other electronic device). The first electronic processor 305 includes input and output interfaces (not shown) and is electrically coupled to a first memory 310, a first network interface 315, a first microphone 320, a first speaker 325, a display 330, and a first camera 335.

The first memory 310 may include read only memory (ROM), random access memory (RAM), other non-transitory computer-readable media, or a combination thereof. The first electronic processor 305 is configured to receive instructions and data from the first memory 310 and execute, among other things, the instructions. In particular, the first electronic processor 305 executes instructions stored in the first memory 310 to perform the methods described herein.

The first network interface 315 sends and receives data to and from other devices in the system 100 (e.g., the docking station 110, the second portable communication device 120, the command center 125, etc.) over the network 130 and/or via a direct-mode wireless link. In some examples, the first network interface 315 includes one or more transceivers and one or more antennas for wirelessly communicating with the network 130 and/or the other devices of the system 100 directly. Alternatively or in addition, the first network interface 315 may include a connector or port (e.g., to connect to the docking terminals 220 of the docking station 110) for receiving a wired connection to the network 130, such as an Ethernet cable. The first electronic processor 305 may transmit and receive data (for example, a video call, an audio call, an image, a text message, an emergency alert message and associated data, sensor input data gathered by one or more sensors of the communication device 115, and the like) over the network 130 and/or directly through the first network interface 315 to/from other devices of the system 100 (e.g., the command center 125). For example, the first electronic processor 305 receives electrical signals representing sound from the first microphone 320 and may communicate information relating to the electrical signals over the network 130 or directly to another device of the system 100 through the first network interface 315 to other devices of the system 100, to allow users to communicate with each other. Similarly, the first electronic processor 305 may output data received from the network 130 or directly from another device of the system 100 via the first network interface 315 through the first speaker 325, the display 330, or a combination thereof.

In some instances, the first electronic processor 305 may communicate an emergency alert notification and related information (e.g., type of reported event, current location of the first portable communication device 115, etc.) over the network 130 or directly to another device of the system 100 through the first network interface 315, for example, for receipt by one or more other devices in the system 100. In some instances, the electronic processor 305 may capture first input data (e.g., using the first camera 335 and/or the first microphone 320) and may stream the first input data to a remote location (e.g., one or more communication devices 120 at the command center) via the first network interface 315.

The display 330 displays images, video, text, and/or data to the user. The display 330 may be a liquid crystal display (LCD) screen or an organic light emitting display (OLED) display screen. In some examples, a touch sensitive input interface may be incorporated into the display 330 as well, allowing the user to interact with content provided to the display 330. In some examples, the display 330 includes a projector or future-developed display technologies. In some examples, the first speaker 325 and the display 330 are referred to as output devices that output data to a user of the communication device 115. In some examples, the first microphone 320, a computer mouse, and/or a keyboard or a touch-sensitive display are referred to as input devices that receive input from a user of the communication device 115. In some instances, any one or a combination of the input devices and output devices may be referred to as a user interface. For example, the user interface may be embodied merely by a touchscreen display. As another example, the user interface may be embodied by a combination of the display 330 and user input devices that form a keyboard. In some instances, the first camera 335 may be referred to as a data capturing device. In some instances, the first portable communication device 115 includes additional data capturing devices such as biometric sensors, temperature sensors, air quality sensors, and/or other types of sensors.

In some examples, the first portable communication device 115 includes fewer or additional components in configurations different from that illustrated in FIG. 3A. For example, the communication device 115 may additionally include a push-to-talk button. As another example, the first portable communication device 115 may include more or fewer first microphones 320, first speakers 325, displays 330, first cameras 335, and/or the like. As another example, the communication device 115 may include additional visual output devices (e.g., one or more light-emitting diodes (LEDs), etc.), additional audio output devices (e.g., a buzzer, a horn, etc.), and/or a haptic output device (e.g., one or more vibration motors, etc.) to output a haptic notification. In some examples, the communication device 115 includes a location component/device (for example, a global positioning system receiver) configured to determine the geographic coordinates of the location of the communication device 115.

In some examples, the first electronic processor 305 may include a plurality of electronic processors that are distributed within the communication device 115 and that together each perform one or more functions. For example, the first electronic processor 305 may include one or more electronic processors that receive data from the first network interface 315 and one or more same and/or different electronic processors that receive user inputs from input devices and control output devices to provide outputs to the user. Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed. In some examples, the communication device 115 performs functionality other than the functionality described below.

As explained previously herein, the first portable communication device 115 and the second portable communication device 120 may have similar components and may provide similar functionality. Although FIG. 3A is labeled and described above as representing the first portable communication device 115 of the alerting device 105, FIG. 3A and its associated explanation of components also applies to the second portable communication device 120 except that the second portable communication device 120 may not be configured to be secured in the docking station 110. The second portable communication device 120 may include similar or identical components as those described above with respect to the first portable communication device 115. Additionally, the second portable communication device 120 may also include fewer or additional components in configurations different from that illustrated in FIG. 3A. For example, different types or versions of second portable communication devices 120 within the system 100 may include different features from different manufacturers. Nevertheless, these different second portable communication devices 120 may run an application ("app"), such as an emergency response application (e.g., the RAVE Guardian Personal Safety Application), that allows for communication between devices of the system 100 as described herein.

Figure 3B:
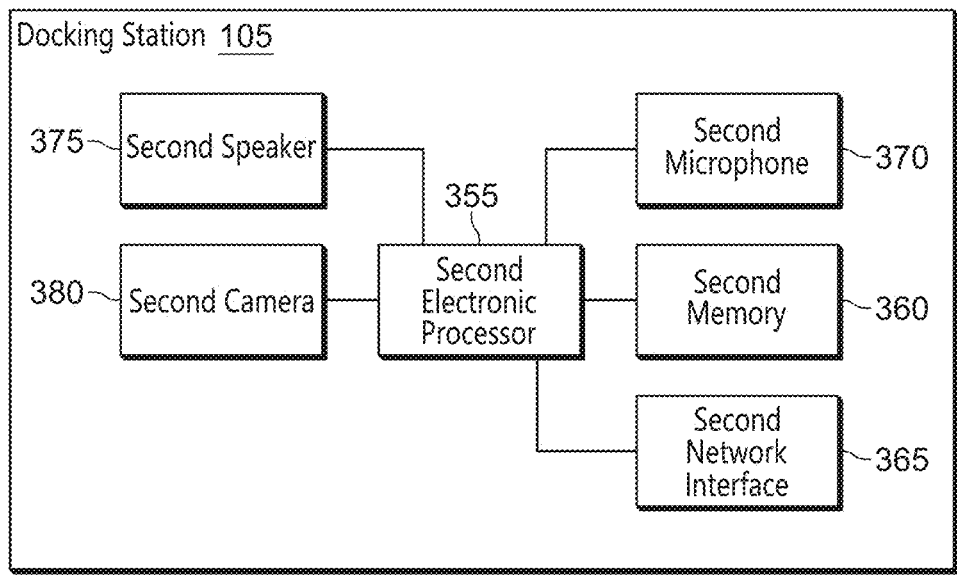
FIG. 3B is a block diagram of the docking station of the alerting device of FIGS. 1-2B according to one example embodiment.

FIG. 3B is a block diagram of a docking station 110 of the alerting device 105 according to one example. In the example shown, the docking station 110 includes a second electronic processor 355 electrically connected to a second memory 360 and a second network interface 365. The second electronic processor 355 may also be electrically connected to a second microphone 370, a second speaker 375 (e.g., one or more of the speakers 225 of FIG. 2B), and a second camera 380 (e.g., the camera 230 of FIG. 2B). These components are similar to the like-named components of the first portable communication device 115 explained above with respect to FIG. 3A and function in a similar manner as described above. In some examples, the second network interface 365 sends and receives captured data to and from the other devices of the system 100 (e.g., the command center 125) via the network 130 (e.g., via a wired or wireless connection) and/or via a direct-mode wireless link. In some examples, the docking station 110 includes fewer or additional components in configurations different from that illustrated in FIG. 3B. For example, the docking station 110 may additionally include a display such as a touch screen. As another example, the docking station 110 may include any of the example fewer or additional components described above with respect to the first portable communication device 115 of FIG. 3A. Also similar to the above description of the first portable communication device 115, in some examples, the second electronic processor 355 may include a plurality of electronic processors that are distributed within the communication device 115 and that together each perform one or more functions. In some examples, the docking station 110 performs functionality other than the functionality described below.

In some instances, the docking station 110 (and/or the first portable communication device 115) may include one or more sensors to detect the presence or absence of the first portable communication device 115 in the docking area 215. For example, such a sensor may include a mechanical sensor/switch that is actuated when the first portable communication device 115 is secured in the docking area 215 and that is unactuated when the first portable communication device 115 is not secured in the docking area 215. As another example, the sensor may include a light sensor where light is blocked by the first portable communication device 115 when the first portable communication device 115 is secured in the docking area 215 and where light is not blocked when the first portable communication device 115 is not secured in the docking area 215. Other types of sensors may be additionally or alternatively used to determine whether the first portable communication device 115 has been removed from and/or re-inserted back into the docking station 110. In some instances, one or both of the electronic processors 305, 355 may determine whether the first portable communication device 115 has been removed from the docking station 110 based on whether there is an electrical/communicative connection with each other via the docking terminals 220.

In some examples, the first portable communication device 115 and the docking station 110 (as well as their components) make up the alerting device 105. In some examples, the alerting device 105 is implemented as a distributed device including one or more components located in different locations/devices. For example, in some embodiments, the alerting device 105 includes components of the first portable communication device 115 (e.g., the first electronic processor 305) and/or components of the docking station 110 (e.g., the second electronic processor 355). In other words, the alerting device 105 may include any one or a combination of electronic processors located within a single device (e.g., the first portable communication device 115 or the docking station 110) or distributed among various devices (e.g., the first portable communication device 115, the docking station 110, the command center 125, etc.). Thus, in the claims, if an apparatus or system, such as the alerting device 105, is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed within a single device or across multiple devices.

As described herein, in some instances, in response to the portable communication device 115 being removed from the docking station 110, the alerting device 105 may automatically output an alert including an audible alert, a visible alert, or both the audible alert and the visible alert to alert others nearby the alerting device 105 that the portable communication device 115 has been removed from the docking station 110 to initiate an emergency report regarding an emergency situation. However, noticeable alerts from the alerting device 105 may be undesirable in certain situations.

Figure 4:
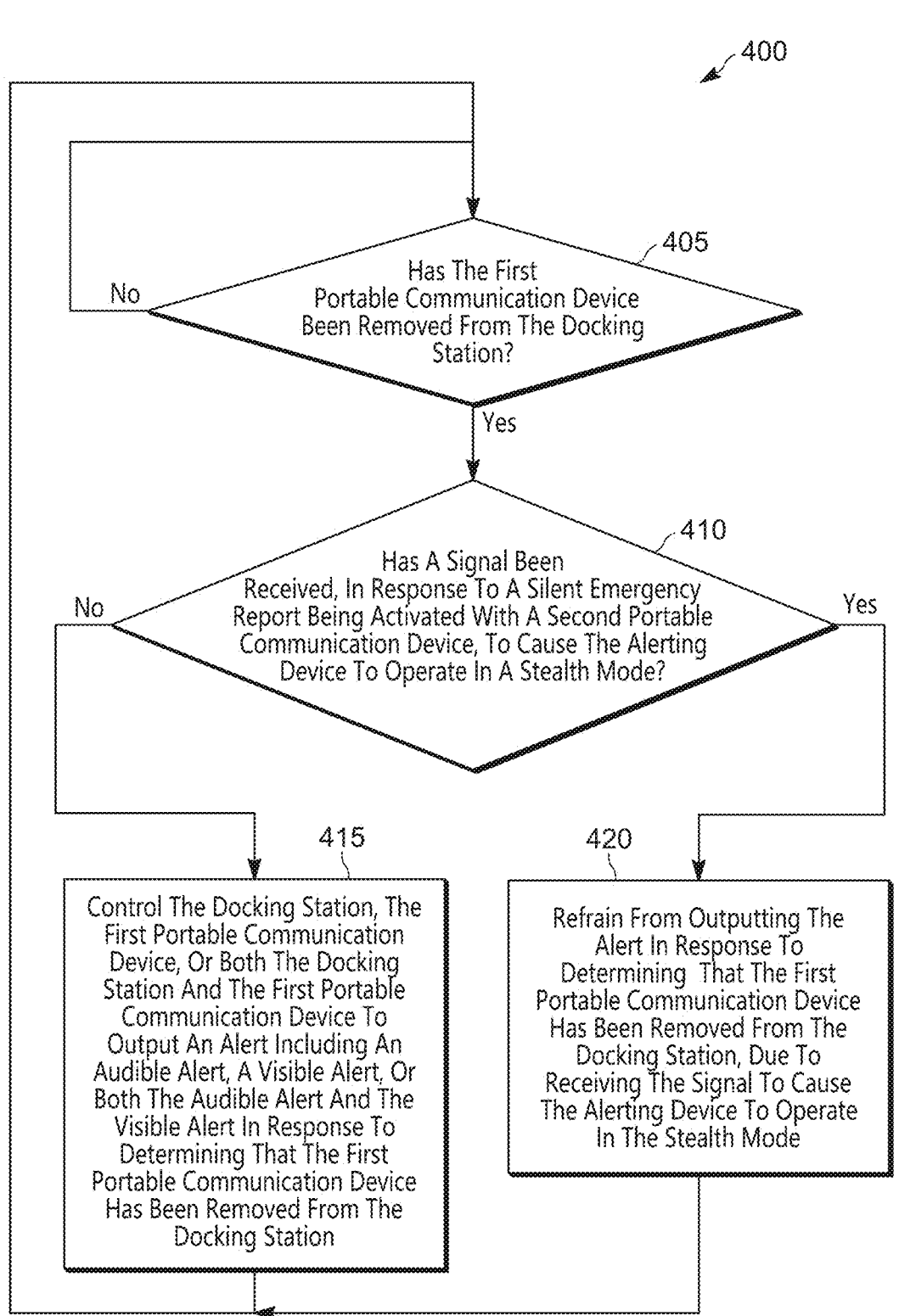
FIG. 4 is a flowchart of a method of controlling the alerting device of FIGS. 1-2B to operate in different alarm modes, according to one example embodiment.

FIG. 4 is a flowchart of a method 400 of controlling the alerting device 105 to operate in different alarm modes, according to one example embodiment. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure.

In some embodiments, the method 400 is performed by the alerting device 105. Specifically, the method 400 may be performed by either one or both of the first electronic processor 305 of the first portable communication device 115 and the second electronic processor 355 of the docking station 110. For the sake of readability, the method 400 is described below as being executed by the alerting device 105 rather than by a specific electronic processor 305, 355 or combination of electronic processors 305, 355, etc.

An instance of the method 400 begins at block 405, where the alerting device 105 determines whether the first portable communication device 115 has been removed from the docking station 110 (e.g., using one or more sensors as explained previously herein). In response to the alerting device 105 determining that the first portable communication device 115 has not been removed from the docking station 110, the method 400 continues to repeat block 405 to determine whether and when the first portable communication device 115 has been removed from the docking station 110. During repetition of block 405, the alerting device 105 may also perform other actions (e.g., communicate with other devices of the communication system 100). In response to the alerting device 105 determining that the first portable communication device 115 has been removed from the docking station 110, the method 400 proceeds to block 410.

At block 410, the alerting device 105 determines whether a signal has been received, in response to a silent emergency report being activated with the second portable communication device 120, to cause the alerting device to operate in a stealth mode. In other words, the alerting device 105 may determine whether an alarm mode of the alerting device 105 is currently set to a stealth mode or a regular/normal mode. In some instances, the default alarm mode of the alerting device 105 may be the regular/normal mode in which the alerting device 105 outputs a noticeable alert (e.g., an audible alert, a visible alert, or both the audible alert and the visible alert) in response to determining that the first portable communication device 115 has been removed from the docking station 110. However, in some instances, the alerting device 105 may change its alarm mode to the stealth mode in response to the alerting device 105 receiving a signal that was generated in response to a silent emergency report being activated with the second portable communication device 120.

In some instances, an electronic processor of the second portable communication device 120 may receive, with a user interface of the second portable communication device 120, a user input activating a silent emergency report at the second portable communication device 120. For example, a user of the second portable communication device 120 may observe a person with a weapon and may provide the user input on the second portable communication device 120 to activate the silent emergency report to report an active shooter situation. In some instances, the electronic processor of the second portable communication device 120 transmits, via a network interface of the second portable communication device 120 and in response to activating the silent emergency report, a signal to cause the alerting device 105 to operate in the stealth mode. In some instances, in the stealth mode, the docking station 110 and the first portable communication device 115 (i.e., the alerting device 105) are configured to refrain from outputting an alert including the audible alert and/or the visible alert in response to determining that the first portable communication device 115 has been removed from the docking station 110 as described herein.

In some instances, the signal transmitted by the second portable communication device 120 includes a wireless beacon signal. In such instances, the electronic processor of the second portable communication device 120 is configured to broadcast the wireless beacon signal for direct receipt by the alerting device 105. The alerting device 105 may be located within a direct communication range of the second portable communication device 120 with respect to the wireless beacon signal. In other words, in response to the activation of the silent emergency report at the second portable communication device 120, the second portable communication device 120 may transmit the signal as a wireless beacon signal such that any alerting devices 105 within direct communication range of the wireless beacon signal may receive the wireless beacon signal and may change their alarm mode to the stealth mode. For example, the alerting device 105 and one or more additional alerting devices 105 that are respectively secured to additional surfaces within the building, may be configured to directly receive (i.e., without communication between an intermediate communication device, alerting device 105, network device such as a repeater or router, etc.) the wireless beacon signal from the second portable communication device 120 and operate in the stealth mode in response to receiving the wireless beacon signal.

In some instances, the direct communication range of the wireless beacon signal may be large enough to ensure that a loud, audible alarm output/notification from an alerting device 105 that is outside of the direct communication range of the wireless beacon signal will not be heard by the user of the second portable communication device 120 and/or by people nearby the second portable communication device 120 at a location of the second portable communication device 120 at a time that the silent emergency report was activated at the second portable communication device 120. On the other hand, an audible alarm output/notification from an alerting device 105 that is within the direct communication range of the wireless beacon signal may be (i.e., is likely to be) heard by the user of the second portable communication device 120 and/or by people nearby the second portable communication device 120 at the location of the second portable communication device 120 at the time that the silent emergency report was activated at the second portable communication device 120. In some instances, a transmission power of the wireless beacon signal may be controlled by the electronic processor of the second portable communication device 120 to correspond to a configurable direct communication range/distance (e.g., 50 feet, 100 feet, 200 feet, or the like).

When the signal output by the second portable communication device 120 is the wireless beacon signal, the alerting devices 105 that receive the wireless beacon signal are limited to those within direct communication range of the second portable communication device 120 while the wireless beacon signal is being output. Thus, the alerting devices 105 that enter the stealth mode in response to receiving the wireless beacon signal are limited to those alerting devices 105 that are nearby (e.g., whose audible alarms are within hearing range of) the location of the second portable communication device 120 at the time that the silent emergency report was activated at the second portable communication device 120. For example, nearby alerting devices 105 may refrain from outputting noticeable alerts to prevent an active shooter from being agitated or being notified that a silent emergency report has been activated. Continuing this example, on the other hand, alerting devices 105 outside of this range/distance may remain in the regular/normal alarm mode since a loud, audible alarm for these more distant alerting devices 105 is unlikely be noticed by an active shooter who is located farther away.

In some instances, the electronic processor of the second portable communication device 120 is configured to broadcast, via the network interface of the second portable communication device 120, the wireless beacon signal for a predetermined period of time after activation of the silent emergency report. The electronic processor of the second portable communication device 120 may be configured to cease broadcasting the wireless beacon signal in response to the predetermined period of time elapsing. The predetermined period of time may be 10 seconds, 30 seconds, 60 seconds, or the like. In some instances, the predetermined period of time is configurable by an administrator device. Broadcasting the wireless beacon signal for only the predetermined period of time in response to activation of the silent emergency report prevents the wireless beacon signal from being sent to too many alerting devices 105 as the second portable communication device 120 (and its user) moves throughout the building since the context of the emergency situation may be changing. For example, it may be assumed that the user and the second portable communication device 120 are located near the active shooter at the time that the silent emergency report was generated. However, the user and the second portable communication device 120 may move away from the active shooter as time passes such that continuing to place nearby alerting devices 105 in the stealth mode is no longer advantageous after the predetermined period of time.

As an alternative to broadcasting a wireless beacon signal, the second portable communication device 120 may, in response to activating the silent emergency report, determine its location and specifically address a stealth mode signal to one or more specific alerting devices 105 in response to determining that the specific alerting device(s) 105 is located within a predetermined proximity of the second portable communication device 120 (e.g., within a proximity that people near the location of the second portable communication device 120 are likely to hear an audible alarm of the alerting device 105 if the first portable communication device 115 is removed from the docking station 110). In some instances, the electronic processor of the second portable communication device 120 (i.e., a third electronic processor) is configured to determine a location of the second portable communication device 120 (e.g., using a location component such as a global positioning system (GPS) receiver) in response to activating the silent emergency report. The third electronic processor may also be configured to determine that the alerting device 105 is located within a predetermined proximity of the location of the second portable communication device 120. For example, the third electronic processor may retrieve a list of locations of alerting devices (e.g., docking stations 110) in a certain area/building that is stored in a local or remote memory. The third electronic processor may also be configured to transmit a signal to the alerting device 105 in response to activating the silent emergency report and in response to determining that the alerting device 105 is located within the predetermined proximity of the location of the second portable communication device 120. In this example, the signal transmitted by the second portable communication device 120 may be addressed to the alerting device 105 (and/or to additional alerting devices 105 located within the predetermined proximity) in response to determining that the alerting device 105 is located within the predetermined proximity of the location of the second portable communication device 120. In some instances, the signal may be transmitted over the network 130 rather than directly to the alerting device 105. In some instances, the predetermined proximity is a predetermined distance/radius from the second portable communication device 120, an indication that the alerting device 105 is located on same floor of a building, etc. In some instances, the predetermined proximity is configurable by an administrator device.

In some instances, the signal transmitted to the specific alerting device 105 may be transmitted by a different device than the second portable communication device 120. For example, the signal may be transmitted by an external device (e.g., a communication device located at the command center 125) that receives the location of the second portable communication device 120 and an indication that the silent emergency report has been activated from the second portable communication device 120. In some examples, the third electronic processor of the second portable communication device 120 may be configured to determine a location of the second portable communication device 120 in response to activating the silent emergency report. The third electronic processor may also be configured to transmit a signal to the external device. The signal may indicate that the silent emergency report has been activated, and may indicate the location of the second portable communication device (e.g., when the silent emergency report was activated). The external device may be configured to receive the signal, and determine that the alerting device 105 is located within a predetermined proximity of the location of the second portable communication device 120 (e.g., by retrieving a list of locations of alerting devices (e.g., docking stations 110) in a certain area/building that is stored in a local or remote memory). The external device may also be configured to transmit a second signal to the alerting device 105 (and/or to additional alerting devices 105 located within the predetermined proximity) in response to determining that the alerting device 105 is located within the predetermined proximity of the location of the second portable communication device 120. The second signal transmitted by the external device may be addressed to the alerting device 105 in response to determining that the alerting device 105 is located within the predetermined proximity of the location of the second portable communication device 120. In some instances, the signal (i.e., first signal) and/or the second signal may be transmitted over the network 130. In this example, even though the signal transmitted by the second portable communication device 120 is not received by the alerting device 105 (rather, a second signal is received), the signal transmitted by the second portable communication device 120 in response to the silent emergency report being activated nevertheless causes the alerting device 105 to operate in a stealth mode since the second signal received by the alerting device 105 is transmitted by the external device in response to receiving the first signal from the second portable communication device 120.

In some instances, the signal from the second portable communication device 120 is configured to trigger the alerting device 105 to begin capturing and streaming (i) first input data from the first camera 335 and/or the first microphone 320, (ii) second input data from the second camera 380 and/or the second microphone 370, or (iii) both the first input data and the second input data. In other words, the alerting device 105 may be configured to begin capturing and streaming the first input data, the second input data, or both the first input data and the second input data in response to receiving the signal that is indicative of the silent emergency report being activated by the second portable communication device 120. In other instances, the alerting device 105, when operating in the stealth mode, is configured to begin capturing and streaming the first input data and/or the second input data in response to determining that the first portable communication device 115 has been removed from the docking station 110.

In some instances, the docking station 110 and the first portable communication device 115 may stream their respective input data over the same wireless network(s) or over different wireless networks. For example, the same wireless network may be used by both devices 110 and 115 when both devices 110 and 115 are connected wirelessly to the same WiFi® router. On the other hand, the docking station 110 may be wirelessly connected to a WiFi® router or to a wired network connection while the first portable communication device 115 may use a 4G or 5G network and/or a different WiFi® network to wirelessly stream input data. Regardless of the specific modes of communication used, in some instances, the docking station 110, the first portable communication device 115, or both the docking station 110 and the first portable communication device 115 may stream captured input data to a remote location (e.g., to one or more communication devices 120 at the command center 125).

At block 410, when a signal indicating that a silent emergency report has been activated at a second portable communication device 120 has not been received by the alerting device 105, the alerting device 105 may operate in its default regular/normal mode rather than entering the stealth mode. Accordingly, the method 400 may proceed to block 415. At block 415, the alerting device 105 controls the docking station 110, the first portable communication device 115, or both the docking station 110 and the first portable communication device 115 to output an alert including an audible alert, a visible alert, or both the audible alert and the visible alert in response to determining that the first portable communication device 115 has been removed from the docking station 110. In other words, the alerting device 105 outputs one or more noticeable alerts in response to determining that the first portable communication device 115 has been removed from the docking station 110 since a nearby second portable communication device 120 has not recently activated a silent emergency report. For example, an audible alert may include a loud noise output by one or more speakers 325, 375, horns, buzzers, etc. As another example, a visible alert may include flashing or solid illumination of one or more lights of the first portable communication device 115 and/or the docking station 110. In some instances, the noticeable alerts may continue for a predetermined period of time or until the alerting device 105 is reset (e.g., via manual user input; via a command communicated to the alerting device 105 from an authorized device, for example, located at the command center 125; via the first portable communication device 115 being re-inserted into the docking station 110; and/or the like).

On the other hand, at block 410, when a signal indicating that a silent emergency report has been activated at a second portable communication device 120 has been received by the alerting device 105, the alerting device 105 may operate in the stealth mode. Accordingly, the method 400 may proceed to block 420. At block 420, the alerting device 105 operates in the stealth mode by refraining from outputting the alert (e.g., the audible alert and/or the visible alert) in response to determining that the first portable communication device 115 has been removed from the docking station 110. In other words, due to receiving the signal indicating that a silent emergency report has been activated at a second portable communication device 120, the alerting device 105 refrains from outputting any noticeable alerts in response to determining that the first portable communication device 115 has been removed from the docking station 110 since a nearby second portable communication device 120 has recently activated a silent emergency report. The recent activation of the silent emergency report from a nearby second portable communication device 120 may indicate that an active shooter may be located nearby the alerting device 105 and may notice and/or be agitated by noticeable alerts that may otherwise be provided by the alerting device 105 in the regular/normal alarm mode.

In some instances, in stealth mode, the alerting device 105 may nevertheless be configured to perform background actions that are performed in regular/normal mode because those actions do not output noticeable alerts. For example, the alerting device 105 may be configured to transmit a notification to the command center 125 at the remote location to indicate that the first portable communication device 115 was removed from the docking station 110. Additionally or alternatively, the alerting device 105 may be configured to begin capturing and streaming (i) first input data from the first camera 335 and/or the first microphone 320, (ii) second input data from the second camera 380 and/or the second microphone 370, or (iii) both the first input data and the second input data in response to the first portable communication device 115 being removed from the docking station 110.

In some instances, after the first portable communication device 115 is removed from the docking station 110, the alerting device 105 may remain in the stealth mode until the first portable communication device 115 is re-inserted into the docking station 110 and the alerting device 105 is reset (e.g., via manual user input, via a command communicated to the alerting device 105, and/or the like). In some instances, at block 410, the alerting device 105 may determine how recently a signal indicative of activation of the silent emergency response report has been received. In some instances, the alerting device 105 may ignore and discard the signal in response to determining that the signal was received longer than a predetermined time period ago (i.e., a stale signal). For example, the predetermined time period may be one minute, five minutes, ten minutes, or the like. In some instances, the predetermined time period is configurable by an administrator device. In other words, the signal indicative of activation of the silent emergency response report may cause the alerting device 105 to operate in the stealth mode for the predetermined time period, but the alerting device 105 may revert to operating in the regular/normal mode once the predetermined time period elapses without the first portable communication device 115 being removed from the docking station 110. In some instances, the alerting device 105 may revert to the regular/normal mode from the stealth mode in response to receiving a reset input/signal (e.g., via manual user input, via a command communicated to the alerting device 105 from an authorized device, for example, located at the command center 125, and/or the like).

In some instances, the method 400 (or portions thereof, such as blocks 405 and 410) may repeat, for example, to continuously monitor (i) whether the first portable communication device 115 has been removed from the docking station 110 and (ii) whether the alerting device 105 has received a signal to cause the alerting device 105 to change its alarm mode (e.g., from a regular/normal mode to a stealth mode). Although FIG. 4 illustrates block 405 before block 410, in some instances, blocks 405 and 410 may be performed in conjunction to adjust the alarm mode of the alerting device 105 and output alerts or refrain from outputting alerts in accordance with the alarm mode in response to the first portable communication device 115 being removed from the docking station 110.

FIG. 5 is a flowchart of a method 500 of controlling the alerting device 105 to operate in different alarm modes, according to one example embodiment. While a particular order of processing steps, message receptions, and/or message transmissions is indicated in FIG. 5 as an example, timing and ordering of such steps, receptions, and transmissions may vary where appropriate without negating the purpose and advantages of the examples set forth in detail throughout the remainder of this disclosure.

In some embodiments, the method 500 is performed by the alerting device 105. Specifically, the method 500 may be performed by either one or both of the first electronic processor 305 of the first portable communication device 115 and the second electronic processor 355 of the docking station 110. For the sake of readability, the method 500 is described below as being executed by the alerting device 105 rather than by a specific electronic processor 305, 355 or combination of electronic processors 305, 355, etc.

An instance of the method 500 begins at block 505, where the alerting device 105 determines that the first portable communication device 115 has been removed from the docking station 110. At block 510, the alerting device 105 controls the docking station 110, the first portable communication device 115, or both the docking station 110 and the first portable communication device 115 to output an alert including an audible alert, a visible alert, or both the audible alert and the visible alert in response to determining that the first portable communication device 115 has been removed from the docking station 110 (i.e., the alerting device 105 operates in the regular/normal alarm mode).

At block 515, the alerting device 105 receives a signal in response to a silent emergency report being activated with the second portable communication device 120. The signal causes the alerting device 105 to operate in a stealth mode as explained previously herein. At block 520, while the first portable communication device 115 is located in the docking station 110, the alerting device 105 determines that the first portable communication device 115 has been removed from the docking station 110. At block 525, the alerting device 105 refrains, due to receiving the signal to cause the alerting device to operate in the stealth mode, from outputting the alert (e.g., the audible alert and/or the visible alert) in response to determining that the first portable communication device has been removed from the docking station 110.

In FIG. 5, blocks 505 and 510 represent operation of the alerting device 105 when the regular/normal alarm mode is implemented. On the other hand, blocks 515, 520, and 525 represent operation of the alerting device 105 when the stealth alarm mode is implemented. Accordingly, blocks 505, 510 are executed at different times than blocks 515, 520, 525, for example during different emergency situations that may occur hours, days, months, or years apart. In some instances, blocks 505, 510 occur after blocks 515, 520, 525. In between implementations of blocks 505, 510 and blocks 515, 520, 525 as well as in between consecutive implementations of blocks 505, 510 or blocks 515, 520, 525, the first portable communication device 115 may be re-inserted into the docking station 110, and the alerting device 105 may be reset (as indicated previously herein) to "clear" an emergency situation after the emergency situation has been handled.

As should be apparent from this detailed description above, the operations and functions of the electronic processor(s) are sufficiently complex as to require their implementation on a computer system, and cannot be performed, as a practical matter, in the human mind. Electronic processors such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot receive a signal generated by a communication device and control an alerting device to operate in a stealth mode to refrain from outputting an alert in response to determining that a first portable communication device has been removed from a docking station, among other features and functions set forth herein).

In the foregoing specification, specific embodiments, examples, aspects, and features have been described. However, one of ordinary skill in the art appreciates that various modifications and changes can be made without departing from the scope of the subject matter as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments, examples, aspects, and features may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, one or more of the embodiments, examples, aspects, and features presented herein can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation. For example, computer program code for carrying out operations of various example embodiments may be written in an object-oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling," or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples and embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system comprising:

an alerting device including:

a docking station secured to a surface within a building and including a first electronic processor, and a first portable communication device removably secured to the docking station, the first portable communication device including a first camera and a first microphone for capturing first input data, and a second electronic processor for streaming the first input data to a remote location via a first network interface;

wherein the alerting device is configured to:

determine that the first portable communication device has been removed from the docking station, and control the docking station, the first portable communication device, or both the docking station and the first portable communication device to output an alert including an audible alert, a visible alert, or both the audible alert and the visible alert in response to determining that the first portable communication device has been removed from the docking station; and a second portable communication device including:

a user interface, a second network interface, and a third electronic processor coupled to the user interface and the second network interface, wherein the third electronic processor is configured to:

receive, via the user interface, a user input activating a silent emergency report at the second portable communication device, and transmit, via the second network interface and in response to activating the silent emergency report, a signal to cause the alerting device to operate in a stealth mode in which the docking station and the first portable communication device are configured to refrain from outputting the alert in response to determining that the first portable communication device has been removed from the docking station.

2. The system of claim 1, wherein the docking station includes a second camera and a second microphone for capturing second input data, and wherein the first electronic processor is configured to stream the second input data to the remote location via a third network interface of the docking station.

3. The system of claim 2, wherein the signal from the second portable communication device is configured to trigger the alerting device to begin capturing and streaming the first input data, the second input data, or both the first input data and the second input data.

4. The system of claim 2, wherein the alerting device, when operating in the stealth mode, is configured to begin capturing and streaming the first input data and the second input data in response to determining that the first portable communication device has been removed from the docking station.

5. The system of claim 1, wherein the signal transmitted by the second portable communication device includes a wireless beacon signal, and wherein the third electronic processor is configured to broadcast the wireless beacon signal for direct receipt by the alerting device, wherein the alerting device is located within a direct communication range of the second portable communication device with respect to the wireless beacon signal.

6. The system of claim 5, further comprising one or more additional alerting devices respectively secured to additional surfaces within the building, wherein the one or more additional alerting devices are configured to directly receive the wireless beacon signal from the second portable communication device and operate in the stealth mode in response to receiving the wireless beacon signal.

7. The system of claim 5, wherein the third electronic processor is configured to:
broadcast the wireless beacon signal for a predetermined period of time; and
cease broadcasting the wireless beacon signal in response to the predetermined period of time elapsing.

8. The system of claim 1, wherein the third electronic processor is configured to:
determine a location of the second portable communication device in response to activating the silent emergency report;
determine that the alerting device is located within a predetermined proximity of the location of the second portable communication device; and
transmit the signal to the alerting device in response to activating the silent emergency report and in response to determining that the alerting device is located within the predetermined proximity of the location of the second portable communication device, wherein the signal transmitted by the second portable communication device is addressed to the alerting device in response to determining that the alerting device is located within the predetermined proximity of the location of the second portable communication device.

9. The system of claim 1, further comprising an external device configured to communicate with the second portable communication device and the alerting device;
wherein the third electronic processor is configured to:

determine a location of the second portable communication device in response to activating the silent emergency report, and
transmit the signal to the external device, wherein the signal indicates that the silent emergency report has been activated, and wherein the signal indicates the location of the second portable communication device,
wherein the external device is configured to:
receive the signal,
determine that the alerting device is located within a predetermined proximity of the location of the second portable communication device, and
transmit a second signal to the alerting device in response to determining that the alerting device is located within the predetermined proximity of the location of the second portable communication device, wherein the second signal transmitted by the external device is addressed to the alerting device in response to determining that the alerting device is located within the predetermined proximity of the location of the second portable communication device.

10. The system of claim 1, wherein the docking station is electrically coupled to an electrical system of the building.

11. A method of operating an alerting device, the method comprising:
determining, with the alerting device, that a first portable communication device of the alerting device has been removed from a docking station of the alerting device, wherein the docking station is secured to a surface within a building and includes a first electronic processor, and wherein the first portable communication device is removably secured to the docking station, and the first portable communication device includes:
a first camera and a first microphone for capturing first input data, and
a second electronic processor for streaming the first input data to a remote location via a first network interface;
controlling, with the alerting device, the docking station, the first portable communication device, or both the docking station and the first portable communication device to output an alert including an audible alert, a visible alert, or both the audible alert and the visible alert in response to determining that the first portable communication device has been removed from the docking station;
receiving, with a third electronic processor of a second portable communication device and via a user interface of the second portable communication device, a user input activating a silent emergency report at the second portable communication device; and
transmitting, with the third electronic processor and via a second network interface of the second portable communication device and in response to activating the silent emergency report, a signal to cause the alerting device to operate in a stealth mode in which the docking station and the first portable communication device are configured to refrain from outputting the alert in response to determining that the first portable communication device has been removed from the docking station.

12. The method of claim 11, wherein the docking station includes a second camera and a second microphone for capturing second input data, and wherein the first electronic processor is configured to stream the second input data to the remote location via a third network interface of the docking station.

13. The method of claim 12, wherein the signal from the second portable communication device triggers the alerting device to begin capturing and streaming the first input data, the second input data, or both the first input data and the second input data.

14. The method of claim 12, further comprising beginning, with the alerting device and when operating in the stealth mode, capturing and streaming the first input data and the second input data in response to determining that the first portable communication device has been removed from the docking station.

15. The method of claim 11, wherein the signal transmitted by the second portable communication device includes a wireless beacon signal, and further comprising broadcasting, with the third electronic processor and via the second network interface, the wireless beacon signal for direct receipt by the alerting device, wherein the alerting device is located within a direct communication range of the second portable communication device with respect to the wireless beacon signal.

16. The method of claim 15, further comprising:

directly receiving, with one or more additional alerting devices respectively secured to additional surfaces within the building, the wireless beacon signal from the second portable communication device; and operating the one or more additional alerting devices in the stealth mode in response to receiving the wireless beacon signal.

17. The method of claim 15, further comprising:

broadcasting, with the third electronic processor, the wireless beacon signal for a predetermined period of time; and ceasing, with the third electronic processor, broadcasting the wireless beacon signal in response to the predetermined period of time elapsing.

18. The method of claim 11, further comprising:

determining, with the third electronic processor, a location of the second portable communication device in response to activating the silent emergency report;

determining, with the third electronic processor, that the alerting device is located within a predetermined proximity of the location of the second portable communication device; and transmitting, with the third electronic processor and via the second network interface, the signal to the alerting device in response to activating the silent emergency report and in response to determining that the alerting device is located within the predetermined proximity of the location of the second portable communication device, wherein the signal transmitted by the second portable communication device is addressed to the alerting device in response to determining that the alerting device is located within the predetermined proximity of the location of the second portable communication device.

19. The method of claim 11, further comprising:

determining, with the third electronic processor, a location of the second portable communication device in response to activating the silent emergency report;

transmitting, with the third electronic processor and via the second network interface, the signal to an external device configured to communicate with the second portable communication device and the alerting device, wherein the signal indicates that the silent emergency report has been activated, and wherein the signal indicates the location of the second portable communication device;

receiving, with the external device, the signal;

determining, with the external device, that the alerting device is located within a predetermined proximity of the location of the second portable communication device; and transmitting, with the external device, a second signal to the alerting device in response to determining that the alerting device is located within the predetermined proximity of the location of the second portable communication device, wherein the second signal transmitted by the external device is addressed to the alerting device in response to determining that the alerting device is located within the predetermined proximity of the location of the second portable communication device.

20. The method of claim 11, wherein the docking station is electrically coupled to an electrical system of the building.

* * * * *